10/20/87 OR 4,701,590

United States Patent [19]

Hatch

[11] Patent Number: 4,701,590

[45] Date of Patent: Oct. 20, 1987

[54] SPRING LOADED ELECTRODE EXPOSURE INTERLOCK DEVICE

[75] Inventor: Bruce O. Hatch, Lebanon, N.H.

[73] Assignee: Thermal Dynamics Corporation, West Lebanon, N.H.

[21] Appl. No.: 853,029

[22] Filed: Apr. 17, 1986

[51] Int. Cl.[4] .................................................. B23K 9/00

[52] U.S. Cl. ....................... 219/121 PR; 219/121 PM; 219/121 PP; 219/75; 219/121 PT

[58] Field of Search .................. 219/121 PP, 121 PM, 219/121 PR, 121 P, 121 PT, 121 PU, 74, 75; 313/231.31, 231.41, 231.51

[56] References Cited

U.S. PATENT DOCUMENTS

| | | | |
|---|---|---|---|
| 3,803,380 | 4/1974 | Ragaller | 219/121 PQ |
| 3,813,510 | 5/1974 | Hatch | 219/121 PQ |
| 4,580,032 | 4/1986 | Carkhuff | 219/121 PQ |
| 4,585,921 | 4/1986 | Wilkins et al. | 219/121 PP |

*Primary Examiner*—M. H. Paschall

*Attorney, Agent, or Firm*—Majestic, Gallagher, Parsons & Siebert

[57] ABSTRACT

A plasma-arc torch is provided having a spring loaded ejector mechanism for expelling the electrode and thereby breaking off electrical contact so as to prevent operation of the torch when necessary parts are not in place.

5 Claims, 4 Drawing Figures

SPRING LOADED ELECTRODE EXPOSURE INTERLOCK DEVICE

BACKGROUND OF THE INVENTION

1. Field of the Invention

This invention is directed to an interlock device for preventing the operation of a plasma-arc cutting system when necessary parts are not in place. It relates specifically to a plasma-arc torch having a spring-loaded electrode that interrupts the electrical circuit through the torch when essential parts are missing.

2. Description of the Prior Art

Plasma-arc torches find wide application to tasks such as cutting, welding and spray bonding. These torches operate by directing a plasma consisting of ionized gas particles toward a workpiece.

In the operation of a typical plasma-arc torch, such as illustrated in U.S. Pat. Nos. 4,324,971; 4,170,727; and 3,813,510, assigned to the same assignee as the present invention, a gas to be ionized is supplied to the front end of the torch in front of a negatively-charged electrode. The torch tip, which is adjacent to the end of the electrode at the front end of the torch, has a sufficiently high voltage applied thereto to cause a spark to jump between the electrode and torch tip, thereby heating the gas and causing it to ionize. A pilot DC voltage between the electrode and the torch tip maintains an arc known as the pilot, or non-transferred arc. The ionized gas in the gap appears as a flame and extends externally off the tip where it can be seen by the operator. As the torch head or front end is brought down towards the workpiece, the arc jumps from the electrode to the workpiece since the impedance of the workpiece current path is lower than the impedance of the torch tip current path.

The ionized gas or working fluid is supplied through a conduit from a source of fluid under pressure to the torch tip. Frequently, a secondary flow of fluid is provided which passes through a separate flow path from the first mentioned working fluid for purposes of cooling various torch parts. In this case, the first mentioned fluid is called the primary fluid or gas and the second is called the secondary fluid or gas.

Because the electrode and tip operate in a very high temperature environment, they must be replaced from time to time as they are used up. Accordingly, torches are design to facilitate periodic replacement of these electrodes and tips as well as other parts.

Sometimes, because of operator carelessness perhaps, a tip, electrode or other essential part is left off the torch during replacement and not present when the torch is operated. This may cause operator injury. It can also cause damage to the torch. For example, if the tip is not in place the arc generated from the electrode may strike and damage another part of the torch.

The assignee's own U.S. patent application Ser. No. 515,950 filed July 20, 1983, now U.S. Pat. No. 4,585,921 issued Apr. 29, 1986 entitled "Torch Operation Interlock Device," describes an electrical circuit means that functions as an operation interlock when torch parts are not in place. If a sensed part is not in place, the control circuit functions to interrupt operation of the torch, thereby minimizing operator injury and torch damage.

Applicant's assignee is also the owner of two other U.S. patent applications, Ser. Nos. 794,288 and 794,389 filed on Nov. 4, 1985, entitled "Electrode Exposure Interlock Device with Pressure Sensing" and "Electrode Exposure Interlock Device with Flow Sensing," respectively. These devices operate on pressure and flow rate. They use changes in pressure and flow rate of the working fluid to indicate the absence of necessary parts.

While a satisfactory solution to the torch parts in place problem, applicant's assignee's prior art devices require more complex construction. The first named requires a complex electrical circuit. A current path must be established through the part or parts to be retained. This requires at least one additional wire to form a circuit. Such a circuit thus adds to cost as well as to complexity.

The latter two devices also require more complex fluid or pressure control circuits as well as control systems. They are thus also more complex.

SUMMARY AND OBJECTS OF THE INVENTION

Applicants invention attempts to solve the parts in place problem by providing a relatively simple mechanism for breaking electrical contact through a necessary part, in this case the electrode. It does this by providing a spring loaded mechanism for ejecting the electrode and thereby opening the power lead circuit when parts are missing.

It is therefore the primary object of this invention to provide a means for preventing operation of a plasma-arc torch when necessary parts are not in place.

It is a further object to provide such a means in the form of an interlock device which is less complex, has fewer parts and therefore is less costly to produce than prior art devices.

Further and other objects and advantages will become more apparent by having reference to the accompanying drawings and the following detailed description and claims.

DETAILED DESCRIPTION

Figure 1:
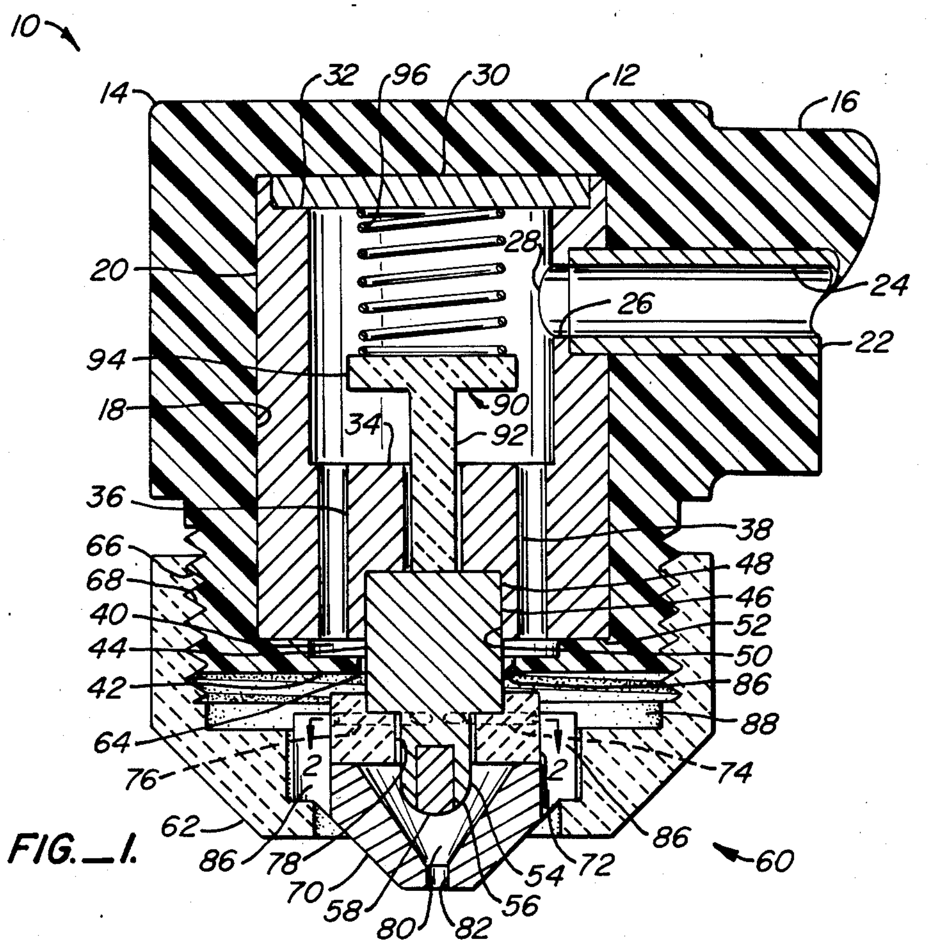
FIG. 1 is a cross sectional view of the front part (torch head) of a plasma-arc torch illustrating the preferred embodiment of the invention.

FIG. 1 is a cross-sectional view of the front portion, or torch head, illustrating details thereof. As shown in this figure, the plasma-arc torch shown generally at 10 is comprised of a torch housing 12 having a head portion 14 joined to a tubular handle portion 16. Head portion 14 has a recess 18 within which is contained a generally cylindrical mounting block 20 of electrically and thermally conductive material such as copper. Mounting block 20 may be conveniently molded into head 14, which is of a thermally and electrically nonconductive material such as molded plastic.

A hollow inlet tube 22 leading to a source of working fluid such as an inert gas, is axially positioned within handle 16. The working fluid enters through passage 24 and inlet tube 22 and thence through the passage 26 and mounting block 20. From passage 26 working fluid then enters a generally cylindrical interior chamber 28 which is defined by a disc-shaped member 30 closing off an open end 32 of mounting block 20 as well as interior end wall 34 thereof. The working fluid such as gas then exits through a plurality of axially-directed passages 36, 38 and thence into annular chamber 40. Annular chamber 40 is formed between mounting block 20, a radial flange 42 of head 14, and the outer peripheral side wall 44 of electrode 46.

Electrode 46 is a generally cylindrical member having a rear end portion fitted within an accommodating receptacle 50 centrally disposed within the forward end wall 52 of mounting block 20. Electrode 46 may be made of an electrically and thermally conductive material such as copper. By dimensioning the receptacle vis-a-vis the rear end portion of electrode 46 to be in close contacting relationship, a good electrical flow path is achieved from mounting block 20 and into electrode 46.

The forward end portion 54 of electrode 46 is also generally cylindrical, but of a smaller diameter than that of the rear end portion 48. It also has a rounded forward nose portion 56 having a centrally disposed insert 58 therein. Insert 58 may be of thermally resistant material such as tungsten, zirconium or hafnium. As may be seen, electrode 46 is positioned and retained within head 14 by means of the front end closure assembly generally shown at 60. Front end closure assembly 60 is comprised of a cup member 62 of ceramic material which is threadedly secured to head 14 over the open end 64 thereof by means of a pair of accommodating threads 66, 68. Also comprising front end closure assembly 60 is a generally conical tip 70 which may be made of copper or other electrically and thermally conductive material. Further comprising front end assembly is a gas distributor 72 of thermally and electrically insulative material such as ceramic.

Figure 2:
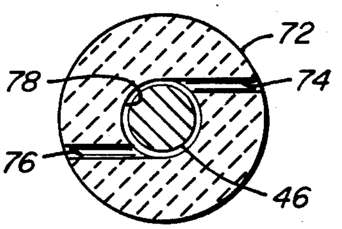
FIG. 2 is a cross sectional view taken along lines 2—2 in FIG. 1.

As shown in this figure and in FIG. 2, gas distributor 72 includes a pair of gas passages 74, 76 therein. Gas distributor 72 also includes an axial bore 78 therethrough, which is dimensioned to be diametrally larger than that of the front end portion 54 of electrode 46 to permit flow of working fluid thereby.

Figure 4:
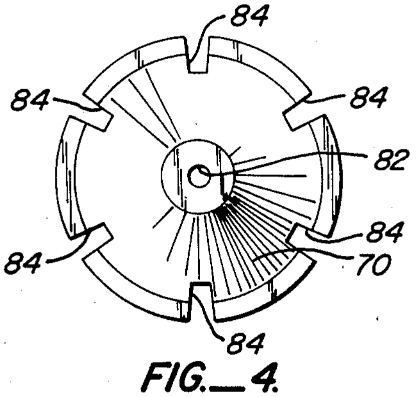
FIG. 4 is a left end elevation view of the same.
Figure 3:
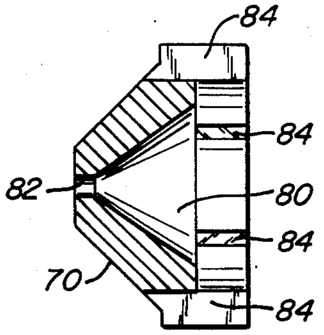
FIG. 3 is a cross sectional elevational view of the torch tip of FIG. 1.

As may be seen in FIG. 3, tip 70 is of generally conical construction having a similarly conically shaped interior chamber 80 therein. An outlet opening 82 permits flow of plasma to the workpiece (not shown). As seen in this figure and FIG. 4, a plurality of radially arranged passages 84 are circumferentially arranged around tip 70 for a purpose to be hereinafter described.

Returning now to FIG. 1, it may be seen that working fluid from annular chamber 40 flows through annular passage 86 and thence into an annular chamber 88 formed between cup 62 and head 14. A primary flow of fluid then flows through passages 74, 76 in gas distributor 72. Because passages 74, 76 are oriented tangentially to bore 78, a vortex action will result, enhancing the cooling effect achieved by the flow of gas around electrode end portion 54 of electrode 46. The vortex action also centers the arc on the electrode. Gas then flows into chamber 80 via tip 70, where it forms a plasma due to the discharge of electricity between electrode 46 and tip 70. A secondary flow of fluid passes through annular passages 86 in tip 70 and then surrounds tip 70 so as to create a cooling shield of gas around tip 70.

A spring loaded ejector 90 is contained within the head. The ejector is comprised of a forward generally elongated stem 92 and a disc-shaped head 94. Coil spring 96 is contained between head 94 and disc-shaped member 30 within interior chamber 28.

In operation, when necessary parts such as tip 70 or gas distributor 72 are not in place, spring-loaded ejector 90 will force electrode 46 from its receptacle 50 and out the front end of the torch head. Stem 92 will move forward until head 94 bottoms against interior end wall 34.

In this manner, electrical contact with and through the electrode is broken and the torch will not operate.

The above description is merely illustrative of the invention and various changes in shapes and sizes, materials, or other details are deemed to be within the scope of the appended claims.

I claim:

1. A plasma-arc torch comprising:

a torch housing of electrically non-conductive material defining a chamber having an outlet opening to the exterior of said housing, an electrically conductive mounting block within said housing defining a receptacle therein, an electrode in said chamber at least partially conntained within and having a portion thereof in electrically contacting relation within said receptacle so as to provide a current path from said mounting block to said electrode, said electrode being adjacent to said outlet opening, closure means removably connectable to said housing for retaining said electrode in said receptacle, an ejector member of a length adapted to contact said electrode and movable from a first position wherein said portion of said electrode is in electrically contacting relation with said receptacle to a second position wherein said portion of said electrode is pushed out of electrically contacting relation with said receptacle thereby breaking said current path, and spring biasing means within said torch housing normally biasing said ejector member in a direction to expel said electrode from said receptacle so that said electrode is moved out of electrical contact and electrical current from said mounting block to said electrode is interrupted when said closure means is removed from said housing.

2. The invention of claim 1 wherein said closure means comprise tip means having an aperture therein for directing plasma, a cup member removably attachable to said housing so as to retain said tip means, and a gas diffuser means intermediate and in contacting relation with said tip means and said electrode so that said electrode is retained in said receptacle means when said cup member is attached to said housing.

3. The invention of claim 2 wherein said tip means comprises a generally conical tip, and wherein said gas diffuser means comprises a generally cylindrical gas diffuser having an axial bore therethrough for passage of said electrode and laterally directed passages therein for distributing secondary fluid to the exterior of said tip for purposes of cooling.

4. The invention of claim 3 wherein said tip and said electrode are made of electrically conductive material, and wherein said diffuser is made of electrically insulative material.

5. The invention of claim 1 wherein said spring biasing means is a spring and wherein said ejector member comprises a generally elongated stem having an enlarged head portion adapted for contacting said spring.

* * * * *